(12) United States Patent
Das et al.

(10) Patent No.: US 9,398,103 B2
(45) Date of Patent: Jul. 19, 2016

(54) METHODS AND APPARATUS FOR ENHANCING DEVICE PERFORMANCE THROUGH FLOW CONTROL

(75) Inventors: Saumitra Mohan Das, San Jose, CA (US); Lorenzo Vicisano, Berkeley, CA (US); Behrooz Khorashadi, Mountain View, CA (US); Bin Wang, Fremont, CA (US); Payam Pakzad, Mountain View, CA (US); Mark Watson, San Francisco, CA (US); Ramin Rezaiifar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 236 days.

(21) Appl. No.: 13/088,169

(22) Filed: Apr. 15, 2011
(Under 37 CFR 1.47)

(65) Prior Publication Data

US 2012/0265897 A1 Oct. 18, 2012

(51) Int. Cl.
*H04L 29/08* (2006.01)
*H04W 28/06* (2009.01)

(52) U.S. Cl.
CPC ............... *H04L 67/22* (2013.01); *H04W 28/06* (2013.01)

(58) Field of Classification Search
CPC . H04L 63/1408; H04L 63/20; H04L 43/0888; H04L 43/10; H04L 63/10; G06F 1/3203; G06F 1/324; G06F 21/552; H04W 52/0219; H04W 84/042; H04W 84/18
See application file for complete search history.

(56) References Cited

U.S. PATENT DOCUMENTS

| 5,511,208 | A  | * | 4/1996  | Boyles et al. ................. 709/223 |
| 5,561,769 | A  | * | 10/1996 | Kumar et al. ................. 709/202 |
| 6,046,980 | A  | * | 4/2000  | Packer ................ H04L 41/0213 370/229 |
| 6,285,658 | B1 | * | 9/2001  | Packer ................ H04L 41/0213 370/229 |
| 6,359,976 | B1 | * | 3/2002  | Kalyanpur et al. ........... 379/134 |
| 6,393,113 | B1 | * | 5/2002  | Karras .......................... 379/133 |
| 6,400,813 | B1 | * | 6/2002  | Birnhak ........................ 379/133 |
| 6,424,626 | B1 | * | 7/2002  | Kidambi et al. .............. 370/236 |
| 6,754,700 | B1 | * | 6/2004  | Gordon et al. ................ 709/219 |
| 6,898,654 | B1 | * | 5/2005  | Senior et al. ................. 710/305 |
| 7,155,512 | B2 | * | 12/2006 | Lean et al. .................... 709/224 |
| 7,197,370 | B1 | * | 3/2007  | Ryskoski ........... G05B 19/4183 700/108 |
| 7,296,288 | B1 | * | 11/2007 | Hill ..................... H04L 41/0896 713/194 |
| 7,426,181 | B1 | * | 9/2008  | Feroz ...................... H04L 47/10 370/230 |
| 7,720,085 | B1 | * | 5/2010  | Okholm ................ H04L 1/1854 370/232 |
| 7,810,089 | B2 | * | 10/2010 | Sundarrajan et al. ......... 717/174 |

(Continued)

FOREIGN PATENT DOCUMENTS

CN  101257454 A  9/2008
IL  WO 2009/156978 A1 * 12/2009  ............... G06N 5/02

(Continued)

OTHER PUBLICATIONS

International Search Report and Written Opinion—PCT/US2012/033838—ISA/EPO—Jul. 25, 2012.

(Continued)

*Primary Examiner* — Sargon Nano
(74) *Attorney, Agent, or Firm* — Howard Seo (57) ABSTRACT

A method and apparatus for enhancing device performance through transport flow control is provided. The method may include determining that a level of user interest is indicated in at least one application of one or more applications, and modifying a transport flow associated with at least one of the one or more applications.

30 Claims, 5 Drawing Sheets

(56) References Cited

U.S. PATENT DOCUMENTS

| | | | |
|---|---|---|---|
| 7,822,837 B1* | 10/2010 | Urban | H04L 12/2602 709/223 |
| 8,151,323 B2* | 4/2012 | Harris et al. | 726/4 |
| 8,589,579 B2* | 11/2013 | Samuels | H04L 41/082 709/231 |
| 8,675,486 B2* | 3/2014 | Friedman | H04B 7/18582 370/235 |
| 8,838,772 B2* | 9/2014 | Beeson | H04L 43/026 709/223 |
| 8,898,280 B2* | 11/2014 | Kosbab | H04L 41/5009 702/182 |
| 9,304,520 B2* | 4/2016 | Cheng | G05D 23/1919 |
| 2001/0023453 A1* | 9/2001 | Sundqvist | H04L 12/5695 709/232 |
| 2003/0095537 A1 | 5/2003 | Murakami et al. | |
| 2006/0195840 A1* | 8/2006 | Sundarrajan et al. | 717/176 |
| 2007/0127513 A1 | 6/2007 | Sudini et al. | |
| 2007/0245409 A1* | 10/2007 | Harris et al. | 726/5 |
| 2008/0081665 A1 | 4/2008 | Hata | |
| 2008/0113655 A1 | 5/2008 | Angelhag | |
| 2008/0266066 A1 | 10/2008 | Braun et al. | |
| 2009/0312029 A1* | 12/2009 | Ananthanarayanan et al. | 455/450 |
| 2010/0020763 A1 | 1/2010 | Ishizu et al. | |
| 2010/0312927 A1* | 12/2010 | Moore et al. | 710/52 |
| 2010/0332594 A1* | 12/2010 | Sundarrajan et al. | 709/203 |
| 2010/0332667 A1* | 12/2010 | Menchaca et al. | 709/228 |
| 2011/0106736 A1* | 5/2011 | Aharonson et al. | 706/12 |
| 2011/0141218 A1* | 6/2011 | Stancato | G06F 21/10 348/14.01 |
| 2011/0148303 A1* | 6/2011 | Van Zyl | H03F 1/56 315/111.21 |
| 2011/0153863 A1* | 6/2011 | Khan et al. | 709/235 |
| 2011/0154464 A1* | 6/2011 | Agarwal et al. | 726/8 |
| 2012/0209946 A1* | 8/2012 | McClure et al. | 709/217 |
| 2013/0271228 A1* | 10/2013 | Tao | H03L 7/183 331/18 |
| 2013/0271288 A1* | 10/2013 | Liang | H04W 28/16 340/870.01 |

FOREIGN PATENT DOCUMENTS

| | | |
|---|---|---|
| JP | 2003158558 A | 5/2003 |
| JP | 2008092135 A | 4/2008 |
| JP | 2010509826 A | 3/2010 |
| JP | 2010219802 A | 9/2010 |
| WO | 2006106303 A1 | 10/2006 |
| WO | 2008056210 A1 | 5/2008 |
| WO | 2009156978 A1 | 12/2009 |

OTHER PUBLICATIONS

Shrikrishna K., et al., "TCP Rate Control," ACM SIGCOMM Computer Communication Review, vol. 30, Issue 1, Jan. 2000, pp. 45-58.

Sun Y., et al., "A Load-Adaptive ACK Pacer for TCP Traffic Control," 2002, pp. 2.

* cited by examiner

METHODS AND APPARATUS FOR ENHANCING DEVICE PERFORMANCE THROUGH FLOW CONTROL

BACKGROUND

1. Field

The disclosed aspects relate generally to communications between devices and specifically to methods and systems for enhancing device performance through TCP flow control based on device-centric characteristics.

2. Background

Advances in technology have resulted in smaller and more powerful personal computing devices. For example, there currently exist a variety of portable personal computing devices, including wireless computing devices, such as portable wireless telephones, personal digital assistants (PDAs) and paging devices that are each small, lightweight, and can be easily carried by users. More specifically, the portable wireless telephones, for example, further include cellular telephones that communicate voice and data packets over wireless networks. Further, many such cellular telephones are being manufactured with relatively large increases in computing capabilities, and as such, are becoming tantamount to small personal computers and hand-held PDAs.

Still further, devices may be configured to run multiple applications, each of which may seek to access content from a network resulting in large variability in bandwidth usage. Even when a user is running multiple applications in which each individual application uses less than the total available bandwidth, the sum of all the applications may use more than the available bandwidth. This results in poor performance for all the applications. Without due care a network bottleneck can degrade one application where it becomes impossible for the user to interact with the application. Currently, cellular networks use large network buffers to deal with the variability of bandwidth of a link which may result due to wireless channel quality and congestion. This variability implies changing bandwidth delay product (BDP) and the need for large buffers to fully utilize the link.

However, fully utilized links create a problem for interactive applications because of the presence of large buffers in the network. For example, if a background task begins to download an album from the network this activity can affect interactive applications with end to end latency requirements. In other words, a large network buffer size increases latency for packets from interactive applications. Not allowing the network buffer to build up is an inefficient use of the network link and can harm the performance of tasks like downloading large content.

Thus, improved apparatus and methods for enhancing user device performance through flow control may be desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more aspects and corresponding disclosure thereof, various aspects are described in relation to enhancing user device performance through flow control. According to one aspect, a method for enhancing user device performance through flow control is provided. The method can comprise determining that a level of user interest is indicated in at least one application of one or more applications. Further, the method can comprise modifying a transport flow associated with at least one of the one or more applications.

Another aspect relates to a computer program product comprising a computer-readable medium. The computer-readable medium comprising code executable to determine that a level of user interest is indicated in at least one application of one or more applications. Further, the computer-readable medium comprises code executable to modifying a transport flow associated with at least one of the one or more applications.

Yet another aspect relates to an apparatus. The apparatus can comprise means for determining that a level of user interest is indicated in at least one application of one or more applications. Further, the apparatus can comprise means for modifying a transport flow associated with at least one of the one or more applications.

Another aspect relates to an apparatus. The apparatus can include a level of interest module operable to determine that a level of user interest is indicated in at least one application of one or more applications. Further, the apparatus may include a flow modification module may be operable to modify a transport flow associated with at least one of the one or more applications.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

Figure 1:
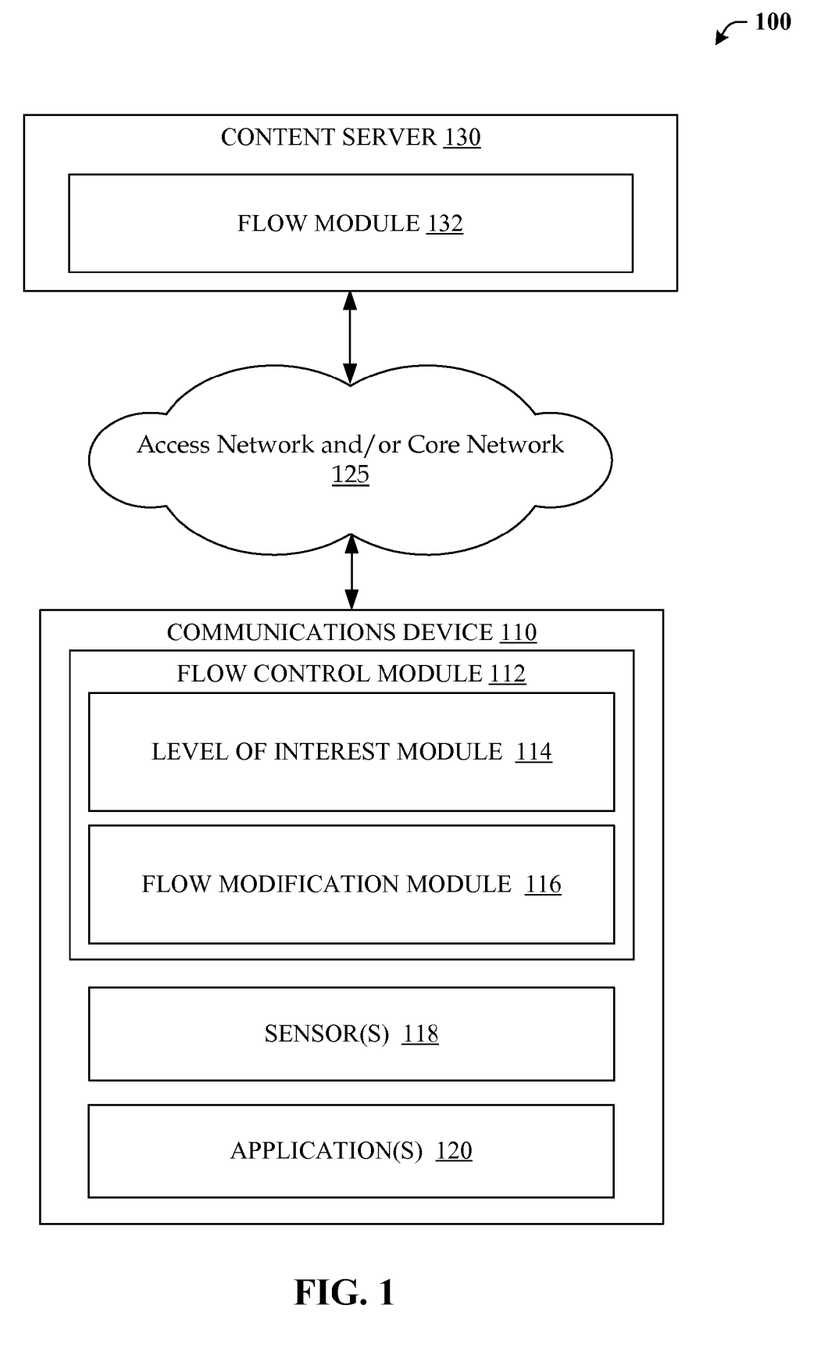
FIG. 1 illustrates a block diagram of a communication network according to an aspect.

Generally, a user may attempt to communicate with an access network and/or core network 125 through a communications device 110. Further, communications device 110 may coordinate with content server 130 to enable applications 120 associated with communications device 110 to communicate content to and from content server 130. In one aspect, a communications device 110 may include: a wireless communications device (WCD), and/or multiple devices, both wireline and wireless. For example, multiple devices may work in tandem, as a network, etc.

With reference to FIG. 1, a block diagram of a communication network 100 according to an aspect is illustrated. Communication network 100 may include communications devices 110 connected to an access network and/or core network 125 (e.g., a CDMA network, a GPRS network, a UMTS network, and other types of wireline and wireless communication networks). Communication network 100 may further include a one or more of servers, such as content server 130, connected to network 125.

In one aspect, communications device 110 may further include flow control module 112, one or more sensors 118 and one or more applications 120. In one aspect, flow control module 112 may further include a level of interest module 114 and a flow modification module 116. Further, in one aspect, content server 130 may include flow module 132 which may be operable to modify one or more flows in communication with communications device 110.

Flow control module 112 may be operable to enhance applications 120 through level of interest module 114. In one aspect, level of interest module 114 may be operable to use explicit, implicit or both types of inputs from a user. Further, flow control module 112 may identify TCP flows and link them to applications 120. In one aspect, flow modification module 116 may prioritize the identified flows. In another aspect, flow modification module 116 may prioritize the flows using a heuristic which, coupled with the level of interest module 114, may identify TCP flows that may be of importance to the user. Further, flow modification module 116 may manipulate the identified flows to increase throughput of the higher priority flows (e.g., those deemed more important to the user by level of interest module 114) and decrease the throughput of the low priority flows (e.g., those deemed less important to the user level of interest module 114). In another aspect, flow modification module 116 may manipulate the identified flows to reduce the latency of high priority flows. As such, flow control module 112 may manage link utilization to improve user experience in a seamless fashion without effecting current network stack protocols. For example, in operation, a video flow may be deemed "important" to a user, while a music file may be deemed less important. The user preference may be detected my level of interest module 114 and flow modification module 116 may reduce the amount of bandwidth or resources allocated to that music file download and increase the bandwidth to the video flow. As such, flow control module 112 effectively improves the performance of the video application and as a result the user experience.

In another aspect, level of interest module 114 may be operable to use communications device 110 sensors 118 to affect flow behavior on cellular links. In one such aspect, level of interest module 114 may be polled to determine if the communications device 110 is used by an interactive application 120 (e.g. web browser, etc.). Upon a determination that communication device is being used by interactive application 120, flow control module 112 may process bulk transfer flows so that the flows do not fill up the network buffer. In one aspect, flow control module 112 may delay packets of the bulk flows. In another aspect, flow control module 112 may advertise a small buffer at the communications device 110 receiver. In still another aspect, flow control module 112 may reduce the window size when an increase in RTT (round trip time) is observed on the flows.

In operation, level of interest module 114 may determine if any application is defined as interactive (e.g. chat, web browser) and may determine that a user is actively interacting with the interactive application. In such an aspect, level of interest module 114 may determine the application is in the foreground. In another aspect, level of interest module 114 may be operable to determine a level of user interest by through processing sensor profiles, such as an accelerometer profile. For example, a sensor profile indicting the communications device is in a users pocket would indicate a low level of user interest. In another example, a sensor profile indicting the communications device is held to the user ear would indicate a low level of user interest.

In one optional aspect, level of interest module 114 may use a speculative constraining engine to constrain flows upon a determination that the communications device is transitioning from an inactive mode to an active mode. In such an aspect, as the constraining is based on speculation of a user interaction, the constraining may be half the amount as may be done otherwise.

In one aspect, flow control module 112 may be operable upon a determination that a network link in use by the communications device 110 is insufficient to handle the multiple applications 120 is used by the client. In one aspect, level of interest module 114, may apply one or more system level heuristics to determine the user's intended experience. Further, level of interest module 114 may be operable in a passive or active mode. Further, in one aspect level of interest module 114 may be operable to directly interact with the user. Still further, in another aspect, level of interest module 114 may continuously monitor user and/or application 120 characteristics.

In one aspect, flow modification module 116 may be in communication with level of interest module 116 and may use the current state of the applications 120 and any input information from level of interest module 114 to manipulate the TCP flows per application and can increase the throughput of more TCP flows deemed more important and reduce TCP flows for applications which were deemed to have less important TCP flows. In one aspect, flow modification module 116 may manipulate flows through manipulated acknowledgement packets for download and uploaded data. Additionally, flow modification module 116 may reduce throughput of low priority flows thereby decreasing latency for the high priority flows by reducing congestion in the network.

As such, communications system 100 provides an environment in which communications device 110 may coordinate with content server 130 to enable enhanced functionality for applications associated with communications device 110.

Figure 2:
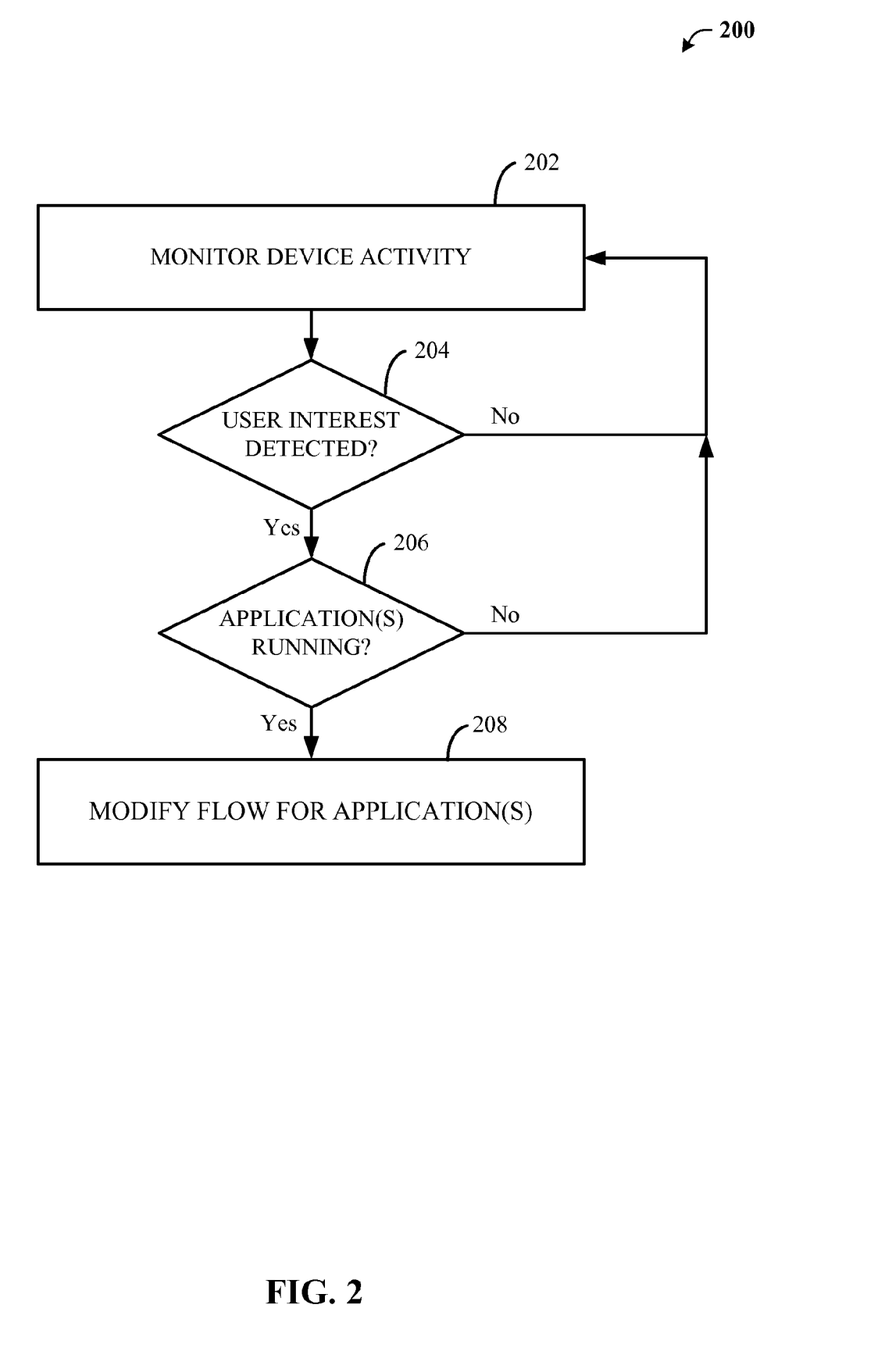
FIG. 2 illustrates a flowchart describing an example system for enhancing device performance through flow control according to an aspect.

FIG. 2 illustrates various methodologies in accordance with various aspects of the presented subject matter. While, for purposes of simplicity of explanation, the methodologies are shown and described as a series of acts or sequence steps, it is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

With reference now to FIG. 2, an exemplary flowchart describing a system for providing enhanced TCP flow control is illustrated. At block 202, a mobile equipment (ME) (e.g., communications device 110), may monitor one or more activity indicators of a level of user interest for the ME. In one aspect, the ME activity may be determined through monitoring sensors associated with the ME to determine if the ME is actively in use. For example, the ME may use an accelerometer, a user interface, a light sensor, a gyroscope, etc, to determine a level of user interest. In another aspect, the ME may determine the application is active when the application is in the foreground on the display of the ME. In still another aspect, a user may define which applications to label as active applications. In one aspect, the active application may be an interactive application. As used herein, an interactive application may an application which is defined as an interactive application and/or is a user is actively interacting with the user interface and the application is in the foreground.

At block 204, it is determined if a level of user interest is detect at the ME. In one aspect, the ME may use one or more sensor profiles to determine that the ME is active. For example, a sensor profile indicting the communications device is in a users pocket would indicate a low level of user interest. In another example, a sensor profile indicting the communications device is held to the user ear would indicate a low level of user interest. If at block 204 it is determined that the ME is not active (e.g., there is not a level of user interest above a threshold value), the process 200 may return to block 202.

By contrast, if at block 204 it is determined that the ME is active, then at block 206 it is determined if there are one or more applications running on the ME. In one aspect, the process may be not invoked if the one or more applications running on the ME use less than a threshold value of available bandwidth from a network. In other words, if communications between the one or more applications and a network do not impede each other, then the process may return to block 202. If at block 206, it is determined an application is not running on the ME and/or if the applications which are running do not impede each other's communications speed, then the process 200 may return to block 202. By contrast, if, at block 206, it is determined than one or more applications are running, then at block 208 the communications flows associated with the one or more applications may be modified.

At block 206, the ME may modify one or more aspects of flows associated with the one or more applications. In one aspect, the ME may modify the TCP flows by prioritizing processing of the TCP flow associated with an active application. In such an aspect, any TCP flows not associated with the active application may be delayed. Further, the delay may be achieved by applying a value to the round trip time (RTT) for outbound acknowledgements for TCP flows not associated with the active application. For example, Let H be the throughput of the high priority flow (e.g., active application) and let L be the throughput of the low priority flow (e.g., non-active applications). Since RTT is inversely proportional to the throughput these values may be expressed in equations (1) and (2) as follows:

$$L = p \sum_{i=0}^{n-1} \frac{1}{r_i} \quad (1)$$

$$H = p \sum_{n}^{n+m-1} \frac{1}{r_i} \quad (2)$$

Where n is the number of low priority flows, m is the number of high priority flows and p is the multiplicative constant of this equation. In order to create the two classes of priority, the bandwidth allocated to the high priority flows may be greater than the low priority flows, as seen in equation (3).

$$H = k*L \quad (3)$$

Where k is a scaling factor. Further, in order to reduce the priority of the low priority flows let $r_i = r_T \forall i : i < n$ where $r_T$ is the target RTT for the low priority flows. Still further, let $$h = \frac{H}{p} = \sum_{i=n}^{n+m-1} \frac{1}{r_i} \text{ then } \sum_{i=0}^{n-1} \frac{1}{r_i} = \frac{n}{r_T} = \frac{h}{k}.$$

This substitution provides an $r_T$ and $r_{i\_delay}$ as described in equation (4), where $r_{i\_delay}$ is the delay that may be added to the current round trip time for the low priority flows.

$$r_T = \frac{nk}{h} \text{ and } r_{i\_delay} = r_T - r_i \quad (4)$$

In another aspect, the ME may modify the TCP flow for an active application by delaying packets of bulk flows not associated with the active application, advertising a small buffer at the receiver, reducing a window size when an increase in RTT is observed on a bulk flow not associated with the active application, etc. In still another application, the ME may modify the TCP flow for the active application when the ME accelerometer profile reports that the ME is being lifted up while previously being in an inactive (e.g., pocket) mode. In such an aspect, the ME may start constraining the bulk flows expecting an interactive application. Further, such constraining may be speculative and may not be performed aggressive. For example, speculative constraining may be approximately half the amount as otherwise may be used.

Figure 3:
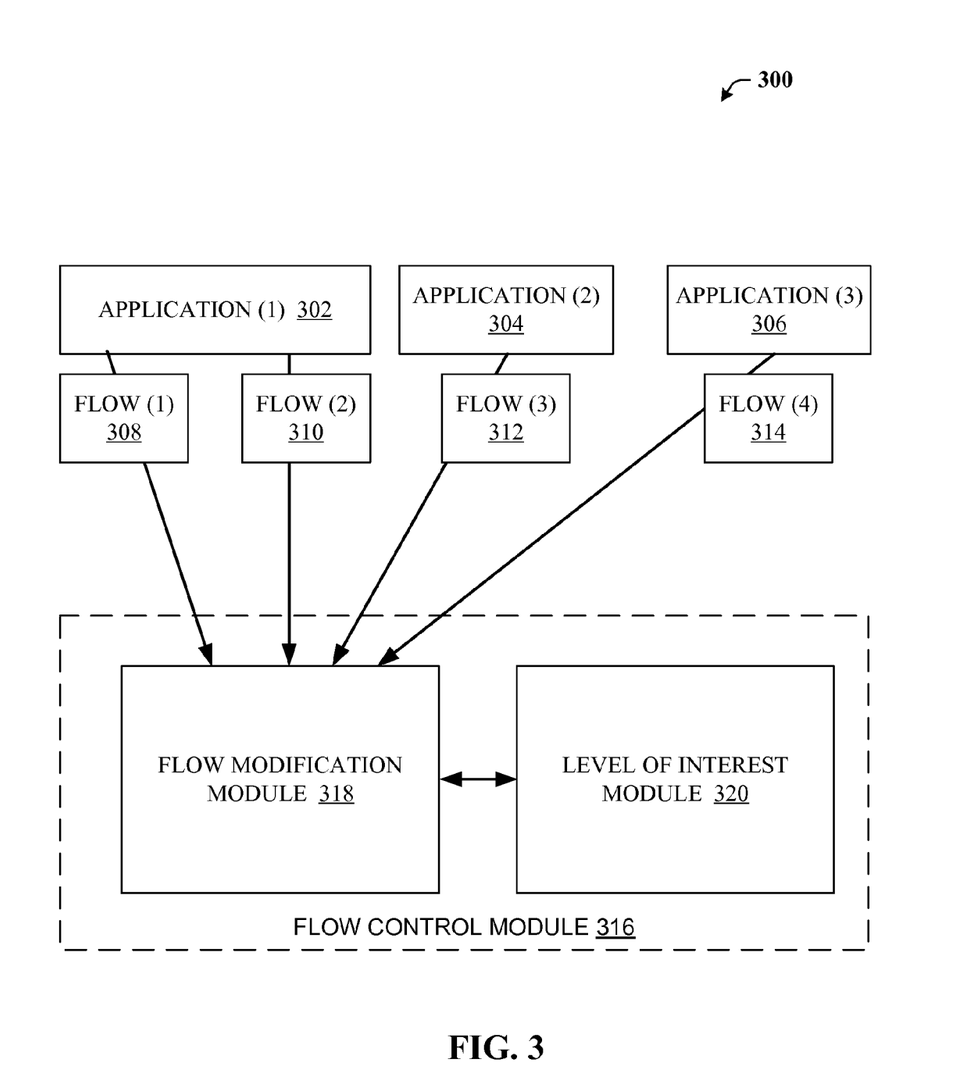
FIG. 3 illustrates a block diagram example of operations of a communications device, according to an aspect.

With reference now to FIG. 3, an example block diagram of operations within a communications device 300 is illustrated. Communications device 300 may be operable to run one or more applications (302, 304, 306), each of which may be operable to use one or more flows (308 310, 312, 314). As depicted in FIG. 3, application (1) 302 may be associated with multiple flows (308, 310), while applications (2) and (3) are each associated with a single flow (312 and 314 respectively). Further, communications device may include flow modification module 318 and level of interest module 320. In one operational aspect, flow modification module 318 and level of interest module 320 may be included in a flow control module 316.

In one aspect, level of interest module 320 may be operable to determine and/or predict a user's level of interest in one or more applications (302, 304, 306). In one aspect, level of interest module 320 may use one or more heuristics to determine and/or predict which applications and, as a result, which TCP flows have a higher priority for the user. By prioritizing the applications through, for example, providing more of the network resources to those applications, level of interest module 320 can enhance the user experience. One example a heuristic level of interest module 320 may use is to give network priority to those applications, which a user is using in the foreground of the device display. In such an example, the user experience may be enhanced by providing more network resources to the foreground application, by reducing network resources available to background applications. In another aspect, other factors, such as, user input or other external inputs may be analyzed in determining the user's level of interest.

In one aspect, flow modification module 318 may be operable to manipulate TCP flows in order to enhance the user experience. Once the user focus is determined by level of interest module 320, flow modification module 318 may begin to manipulate TCP flows in order to enhance the user experience. In one aspect, flow modification module 318 may enhance user experience through a variety of actions, such as, by manipulating TCP acknowledgement packets, etc. By delaying the acknowledgement on a per flow bases, the flow modification module 318 may manage sender throughput for a given TCP flow. Since round trip delay or RTT is directly proportional to the throughput of any given TCP flow, increasing the overall RTT by delaying acknowledgement packets may effectively reduce the TCP throughput of an application relative to the other TCP flows on the link.

In another aspect, flow modification module 318 may manipulate flows by applying a value to the RTT for outbound acknowledgements for TCP flows not associated with the active application, as described above with reference to equations (1) to (4).

As such, communications device 300 may provide an enhanced user experience while using current network technologies and which may be implemented, without significant user knowledge or interaction. Benefits may include enhancement of user experience by increasing the throughput and decreasing the latency of high priority flows.

Figure 4:
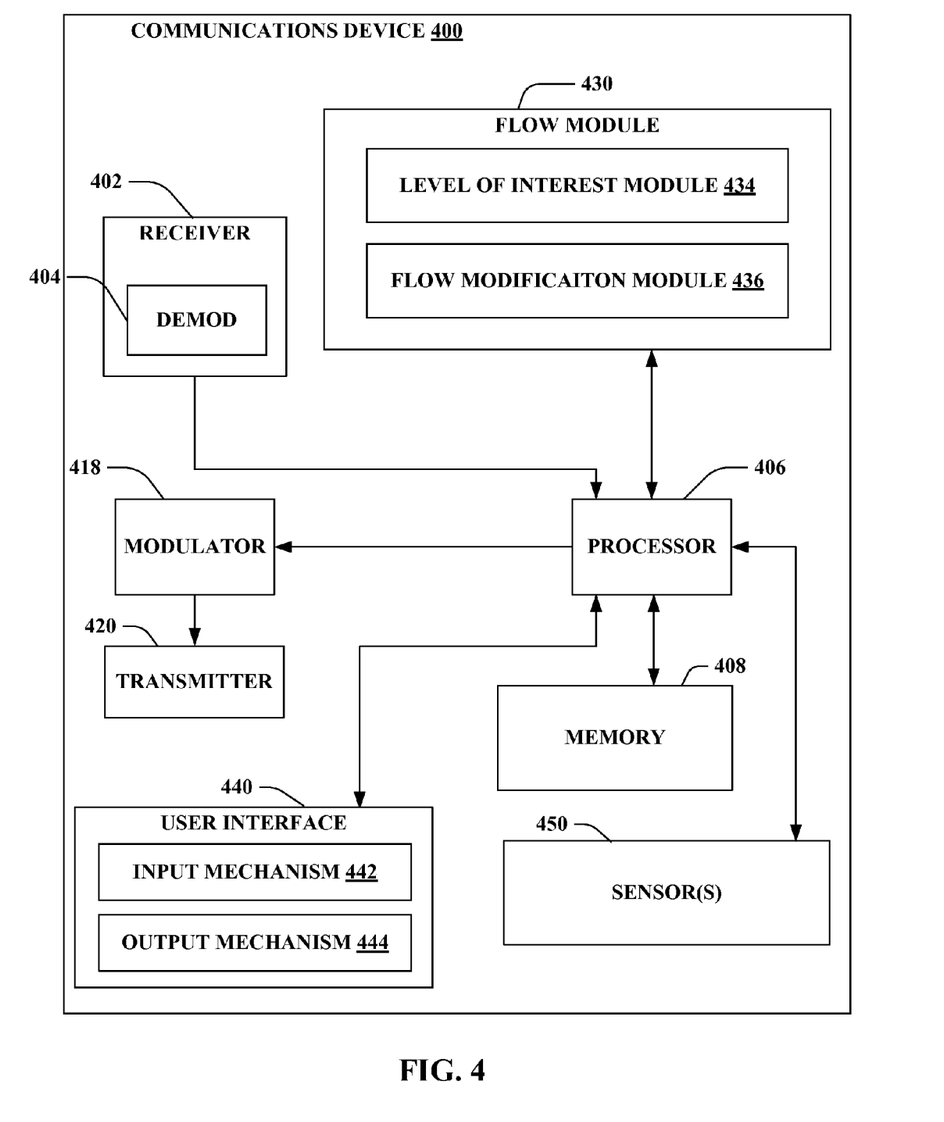
FIG. 4 illustrates a block diagram example architecture of a communications device, according to an aspect.

While still referencing FIG. 1, but turning also now to FIG. 4, an example architecture of communications device 110 is illustrated. As depicted in FIG. 4, device 400 comprises receiver 402 that receives a signal from, for instance, a receive antenna (not shown), performs typical actions on (e.g., filters, amplifies, downconverts, etc.) the received signal, and digitizes the conditioned signal to obtain samples. Receiver 402 can comprise a demodulator 404 that can demodulate received symbols and provide them to processor 406 for channel estimation. Processor 406 can be a processor dedicated to analyzing information received by receiver 402 and/or generating information for transmission by transmitter 420, a processor that controls one or more components of device 400, and/or a processor that both analyzes information received by receiver 402, generates information for transmission by transmitter 420, and controls one or more components of device 400. Further, signals may be prepared for transmission by transmitter 420 through modulator 418 which may modulate the signals processed by processor 406.

Device 400 can additionally comprise memory 408 that is operatively coupled to processor 406 and that can store data to be transmitted, received data, information related to available channels, TCP flows, data associated with analyzed signal and/or interference strength, information related to an assigned channel, power, rate, or the like, and any other suitable information for estimating a channel and communicating via the channel.

Further, processor 406 can provide means for determining that a level of user interest is indicated in at least one application of one or more applications, and means for modifying a transport flow associated with at least one of the one or more applications.

It will be appreciated that data store (e.g., memory 408) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory 408 of the subject systems and methods may comprise, without being limited to, these and any other suitable types of memory.

Device 400 can further include flow module 430 to enhance applications through level of interest module 434 and flow medication module 436. In one aspect, level of interest module 434 may be operable to use explicit, implicit or both types of inputs from a user. Further, flow module 430 may identify TCP flows and link them to applications. In one aspect, flow modification module 436 may prioritize the identified flows. In another aspect, flow modification module 436 may prioritize the flows using a heuristic which, coupled with the level of interest module 434, may identify TCP flows that may be of importance to the user. Further, flow modification module 436 may manipulate the identified flows to increase throughput of the higher priority flows (e.g., those deemed more important to the user by level of interest module 434) and decrease the throughput of the low priority flows (e.g., those deemed less important to the user level of interest module 434). In another aspect, flow modification module 436 may manipulate the identified flows to reduce the latency of high priority flows. As such, flow module 530 may manage link utilization to improve user experience in a seamless fashion without effecting current network stack protocols. For example, in operation, a video flow may be deemed "important" to a user, while a music file may be deemed less important. The user preference may be detected my level of interest module 434 and flow modification module 436 may reduce the amount of bandwidth or resources allocated to that music file download and increase the bandwidth to the video flow. As such, flow module 430 may effectively improve the performance of the video application and as a result the user experience.

In another aspect, communication device 400 may include one or more sensors 450. In one aspect, sensors 450 may include an accelerometer, a light sensor, a gyroscope, etc. In such an aspect, level of interest module 434 may be operable to use communications device 400 sensors 450 to affect flow behavior on cellular links. In one such aspect, level of interest module 434 may be polled to determine if the communications device 400 is used by an interactive application (e.g. web browser, etc.). Upon a determination that communication device 400 is being used by an interactive application, flow module 430 may process bulk transfer flows so that the flows do not fill up the network buffer. In one aspect, flow module 430 may delay packets of the bulk flows. In another aspect, flow module 430 may advertise a small buffer at the communications device 400 receiver 402. In still another aspect, flow module 430 may reduce the window size when an increase in RTT is observed on the flows.

In operation, level of interest module 434 may determine if any application is defined as interactive (e.g. chat, web browser) and may determine that a user is actively interacting with the interactive application. In such an aspect, level of interest module 434 may determine the application is in the foreground. In another aspect, level of interest module 434 may be operable to determine a level of user interest by through processing sensor profiles, such as an accelerometer profile. For example, a sensor 450 may provide a sensor profile indicting the communications device is in a users pocket would indicate a low level of user interest. In another example, a sensor 450 may provide a sensor profile indicting the communications device is held to the user ear would indicate a low level of user interest.

In one optional aspect, level of interest module 434 may use a speculative constraining engine to constrain flows upon a determination that the communications device is transitioning from an inactive mode to an active mode. In such an aspect, as the constraining is based on speculation of a user interaction, the constraining may be half the amount as may be done otherwise.

In one aspect, flow module 430 may be operable upon a determination that a network link in use by the communications device 400 is insufficient to handle the multiple applications is used by the client. In one aspect, level of interest module 434, may apply one or more system level heuristics to determine the user's intended experience. Further, level of interest module 434 may be operable in a passive or active mode. Further, in one aspect level of interest module 434 may be operable to directly interact with the user. Still further, in another aspect, level of interest module 434 may continuously monitor user and/or application characteristics.

In one aspect, flow modification module 436 may be in communication with level of interest module 434 and may use the current state of the applications and any input information from level of interest module 434 to manipulate the TCP flows per application. Further, flow modification module 436 can increase the throughput of more TCP flows deemed more important and reduce TCP flows for applications which were deemed to have less important TCP flows. In one aspect, flow modification module 436 may manipulate flows through manipulated acknowledgement packets for download and uploaded data. Additionally, flow modification module 436 may reduce throughput of low priority flows thereby decreasing latency for the high priority flows by reducing congestion in the network.

Additionally, communications device 400 may include user interface 440. User interface 440 may include input mechanisms 442 for generating inputs into communications device 400, and output mechanism 442 for generating information for consumption by the user of the communications device 400. For example, input mechanism 442 may include a mechanism such as a key or keyboard, a mouse, a touch-screen display, a microphone, etc. Further, for example, output mechanism 444 may include a display, an audio speaker, a haptic feedback mechanism, a Personal Area Network (PAN) transceiver etc. In the illustrated aspects, the output mechanism 444 may include a display operable to present media content that is in image or video format or an audio speaker to present media content that is in an audio format.

Figure 5:
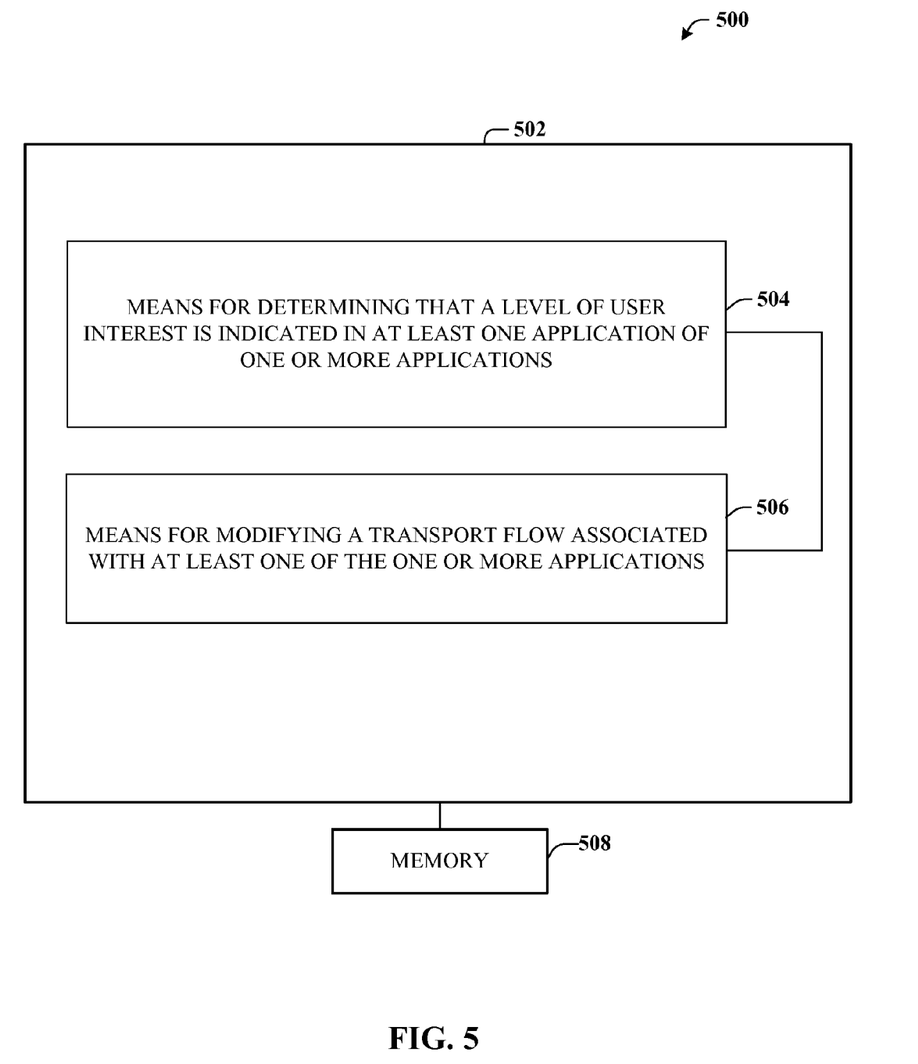
FIG. 5 illustrates a block diagram of an example communication system that can enhance device performance through flow control, according to an aspect.

With reference to FIG. 5, illustrated is a system 500 for enhancing device performance through TCP flow control based, according to one aspect. For example, system 500 can reside at least partially within a communications device, user equipment, etc. It is to be appreciated that system 500 is represented as including functional blocks, which can be functional blocks that represent functions implemented by a processor, software, or combination thereof (e.g., firmware).

System 500 includes a logical grouping 502 of means that can act in conjunction. For instance, logical grouping 502 can include means for determining that a level of user interest is indicated in at least one application of one or more applications 504. In one aspect, the one or more internal parameters may include a state of a service parameter, a configuration parameter, etc. In another aspect, means for determining may include means for using one or more sensors associated with a device to determine that the indicated at least one application of the one or more applications is active. In such an aspect, the one or more sensors may include: an accelerometer, a user interface, a light sensor, a gyroscope, etc. In another aspect, the level of user interest may be indicated through means for determining the at least one application of the one or more applications is an interactive application. In another aspect, the level of user interest may be indicated through means for determining the at least one application of the one or more applications is in the foreground.

Logical grouping 502 can further include means for modifying a transport flow associated with at least one of the one or more applications. 506 In one aspect, the means for modifying includes means for prioritizing the transport flow associated with the at least one application of the one or more applications over transport flows not associated with the at least one application of the one or more applications. In such an aspect, the means for prioritizing may include means for delaying outbound acknowledgements for transport flows not associated with the at least one application of the one or more applications by adding a time value to each round trip time (RTT) for outbound acknowledgements. Further, in such an aspect, the time value may include: a constant value, a multiplicative value that proportionally increases RTT for the applications other than the at least one application of the one or more applications, etc. In one aspect, the means for modifying may include means for advertising a reduced buffer size for the at least one application of the one or more applications, means for delaying bulk flows for applications other than the at least one application of the one or more applications, etc. Further, when the means for determining the level of user interest is indicated in the at least one application of one or more applications defines a first interactive application, logical grouping 502 can include means for determining that a level of user interest is not indicated in a second application of the one or more applications, wherein the second application is not an interactive application, and wherein the means for modifying further comprises means for reducing a second transport flow of the second application in order to prioritize a first transport flow of the first interactive application.

Additionally, system 500 can include a memory 508 that retains instructions for executing functions associated with the means 504 and 506. While shown as being external to memory 508, it is to be understood that one or more of the means 504 and 506 can exist within memory 508.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, mobile equipment (ME), remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An example storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or aspects, it should be noted that various changes and modifications could be made herein without departing from the scope of the described aspects and/or aspects as defined by the appended claims. Furthermore, although elements of the described aspects and/or aspects may be described or claimed in the singular, the plural is contemplated unless limitation to the singular is explicitly stated. Additionally, all or a portion of any aspect and/or aspect may be utilized with all or a portion of any other aspect and/or aspect, unless stated otherwise.

What is claimed is:

1. A method of wireless communications, comprising:
   determining a level of user interest in at least one application of one or more applications based on one or more sensors associated with a device, wherein the one or more sensors determine that the at least one application of the one or more applications is active, and wherein the one or more sensors includes one or more of an accelerometer, a user interface, a light sensor, or a gyroscope; and
   based on the determination and speculation of user interaction, modifying a transport flow associated with the at least one application of the one or more applications for prioritizing one or more transport flows, wherein the transport flow comprises a Transmission Control Protocol (TCP) flow, and wherein the transport flow is constrained upon:
   determining that the device utilized for the wireless communications has transitioned from an inactive mode to an active mode based on the speculation of the user interaction; and
   determining that the at least one application of the one or more applications running on the device utilizes a threshold value of available bandwidth.

2. The method of claim 1, wherein the level of user interest is indicated by one or more of:
   determining the at least one application of the one or more applications is an interactive application;
   determining the at least one application of the one or more applications is in the foreground; or
   one or more user defined settings.

3. The method of claim 1, further comprising:
   wherein determining the level of user interest in the at least one application of the one or more applications defines a first interactive application;
   determining the level of user interest in a second application of the one or more applications, wherein the second application is not an interactive application; and
   wherein the modifying further comprises reducing a second transport flow of the second application in order to prioritize a first transport flow of the first interactive application.

4. The method of claim 1, wherein the modifying further comprises:
   prioritizing the transport flow associated with the at least one application of the one or more applications over transport flows not associated with the at least one application of the one or more applications.

5. The method of claim 4, wherein the prioritizing further comprises delaying outbound acknowledgements for the transport flows not associated with the at least one application of the one or more applications by adding a time value to each round trip time (RTT) for the outbound acknowledgements.

6. The method of claim 5, wherein the time value comprises either a constant value or a multiplicative value that proportionally increases RTT for applications other than the at least one application of the one or more applications.

7. The method of claim 1, wherein the modifying further comprises one or more of:
   advertising a reduced buffer size for the at least one application of the one or more applications, and
   delaying bulk flows for applications other than the at least one application of the one or more applications.

8. A non-transitory computer-readable medium storing computer executable code comprising code to:
   determine a level of user interest in at least one application of one or more applications based on one or more sensors associated with a device, wherein the one or more sensors determine that the at least one application of the one or more applications is active, and wherein the one or more sensors includes one or more of an accelerometer, a user interface, a light sensor, or a gyroscope; and
   based on the determination and on speculation of user interaction, modify a transport flow associated with the at least one application of the one or more applications for prioritizing one or more transport flows, wherein the transport flow comprises a Transmission Control Protocol (TCP) flow, and wherein the transport flow is constrained upon:
   determining a transition from an inactive mode to an active mode based on the speculation of the user interaction; and
   determining that the at least one application of the one or more applications running on the device utilizes a threshold value of available bandwidth.

9. The non-transitory computer-readable medium of claim 8, further comprising code to determine one or both of:
   that the at least one application of the one or more applications is an interactive application; and
   that the at least one application of the one or more applications is in the foreground.

10. The non-transitory computer-readable medium of claim 8, wherein the level of user interest is indicated by one or more user defined settings.

11. The non-transitory computer-readable medium of claim 8, wherein determining the level of user interest in the at least one application of the one or more applications defines a first interactive application, and wherein the non-transitory computer-readable medium further comprises code to:
   determine the level of user interest in a second application of the one or more applications, wherein the second application is not an interactive application, and
   reduce a second transport flow of the second application in order to prioritize a first transport flow of the first interactive application.

12. The non-transitory computer-readable medium of claim 8, further comprising code to:
   prioritize the transport flow associated with the at least one application of the one or more applications over transport flows not associated with the at least one application of the one or more applications.

13. The non-transitory computer-readable medium of claim 12, further comprising code to:
delay outbound acknowledgements for the transport flows not associated with the at least one application of the one or more applications by adding a time value to each round trip time (RTT) for the outbound acknowledgements.

14. The non-transitory computer-readable medium of claim 13, wherein the time value comprises either a constant value or a multiplicative value that proportionally increases RTT for the applications other than the at least one application of the one or more applications.

15. The non-transitory computer-readable medium of claim 8, further comprising code to perform one or both of:
advertise a reduced buffer size for the at least one application of the one or more applications, or
delay bulk flows for applications other than the at least one application of the one or more applications.

16. An apparatus, comprising:
means for determining a level of user interest in at least one application of one or more applications based on one or more sensors associated with a device, wherein the one or more sensors determine that the at least one application of the one or more applications is active, and wherein the one or more sensors includes one or more of an accelerometer, a user interface, a light sensor, or a gyroscope; and
means for, based on the determination and speculation of user interaction, modifying a transport flow associated with the at least one application of the one or more applications for prioritizing one or more transport flows, wherein the transport flow comprises a Transmission Control Protocol (TCP) flow, and wherein the transport flow is constrained upon:
determining that the apparatus has transitioned from an inactive mode to an active mode based on the speculation of the user interaction; and
determining that the at least one application of the one or more applications running on the device utilizes a threshold value of available bandwidth.

17. The apparatus of claim 16, wherein the level of user interest is indicated by one or more of:
means for determining the at least one application of the one or more applications is an interactive application;
means for determining the at least one application of the one or more applications is in the foreground; or
one or more user defined settings.

18. The apparatus of claim 16, wherein means for determining the level of user interest in the at least one application of the one or more applications defines a first interactive application, further comprising:
means for determining that a level of user interest in a second application of the one or more applications, wherein the second application is not an interactive application; and
wherein the means for modifying further comprises means for reducing a second transport flow of the second application in order to prioritize a first transport flow of the first interactive application.

19. The apparatus of claim 16, wherein the means for modifying further comprises:
means for prioritizing the transport flow associated with the at least one application of the one or more applications over transport flows not associated with the at least one application of the one or more applications.

20. The apparatus of claim 19, wherein the means for prioritizing further comprises means for delaying outbound acknowledgements for the transport flows not associated with the at least one application of the one or more applications by adding a time value to each round trip time (RTT) for the outbound acknowledgements.

21. The apparatus of claim 20, wherein the time value comprises either a constant value or a multiplicative value that proportionally increases RTT for the applications other than the at least one application of the one or more applications.

22. The apparatus of claim 16, wherein the means for modifying further comprises one or both of:
means for advertising a reduced buffer size for the at least one application of the one or more applications, or
means for delaying bulk flows for applications other than the at least one application of the one or more applications.

23. An apparatus for communications, comprising:
a level of interest module operable for:
determining a level of user interest in at least one application of one or more applications based on one or more sensors associated with a device, wherein the one or more sensors determine that the at least one application of the one or more applications is active, and wherein the one or more sensors includes one or more of an accelerometer, a user interface, a light sensor, or a gyroscope; and
a flow modification module operable for:
modifying, based on the determination of the level of interest module and speculation of user interaction, a transport flow associated with the at least one application of the one or more applications for prioritizing one or more transport flows, wherein the transport flow comprises a Transmission Control Protocol (TCP) flow, and wherein the transport flow is constrained upon:
determining that the apparatus has transitioned from an inactive mode to an active mode based on the speculation of the user interaction; and
determining that the at least one application of the one or more applications running on the device utilizes a threshold value of available bandwidth.

24. The apparatus of claim 23, wherein the level of user interest is determined by one or more user defined settings.

25. The apparatus of claim 23, wherein the level of interest module is further operable for determining one or both of:
that the at least one application of the one or more applications is an interactive application; or
that the at least one application of the one or more applications is in the foreground.

26. The apparatus of claim 23, wherein determining the level of user interest in the at least one application of the one or more applications defines a first interactive application,
wherein the level of interest module is further operable for determining a level of user interest in a second application of the one or more applications,
wherein the second application is not an interactive application, or
wherein the flow modification module is further operable for reducing a second transport flow of the second application in order to prioritize a first transport flow of the first interactive application.

27. The apparatus of claim 23, wherein the flow modification module is further operable for:
prioritizing the transport flow associated with the at least one application of the one or more applications over transport flows not associated with the at least one application of the one or more applications.

28. The apparatus of claim 27, wherein the flow modification module is further operable for:
delaying outbound acknowledgements for the transport flows not associated with the at least one application of the one or more applications by adding a time value to each round trip time (RTT) for the outbound acknowledgements.

29. The apparatus of claim 28, wherein the time value comprises either: a constant value or a multiplicative value that proportionally increases RTT for the applications other than the at least one application of the one or more applications.

30. The apparatus of claim 23, wherein the flow modification module is further operable for one or both of:
advertizing a reduced buffer size for the at least one application of the one or more applications, or
delaying bulk flows for applications other than the at least one application of the one or more applications.

* * * * *